May 29, 1956  E. F. DOSKOCIL  2,747,492
CLOD KNOCKER
Filed Jan. 19, 1954
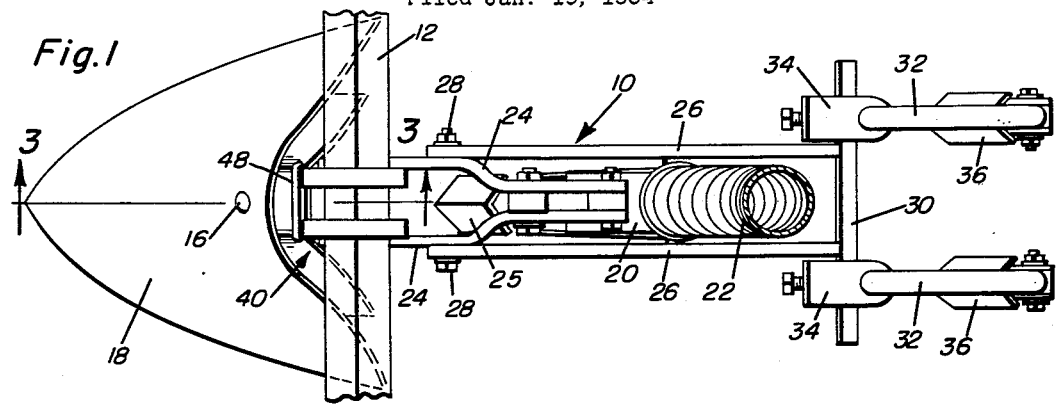
Fig. 1
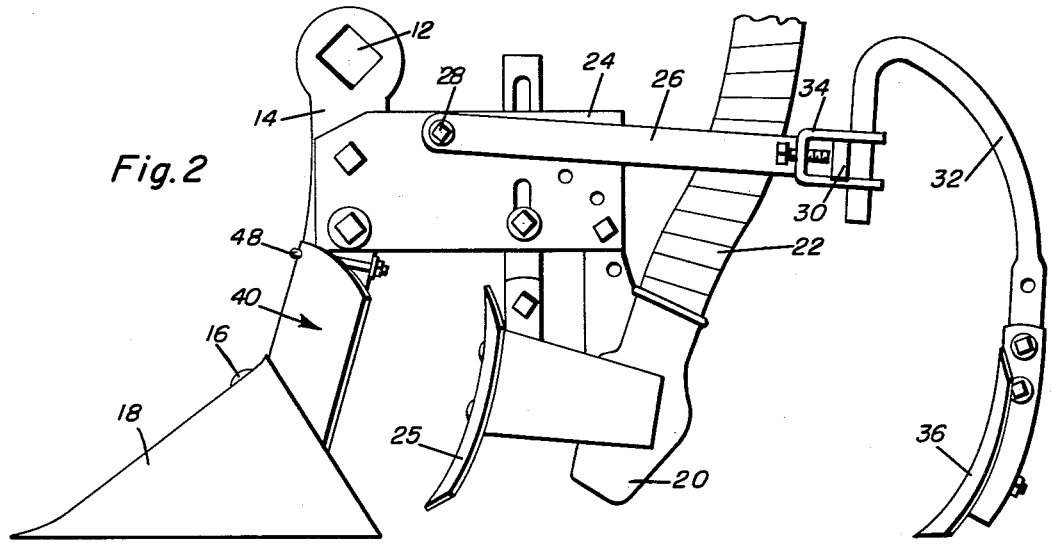
Fig. 2
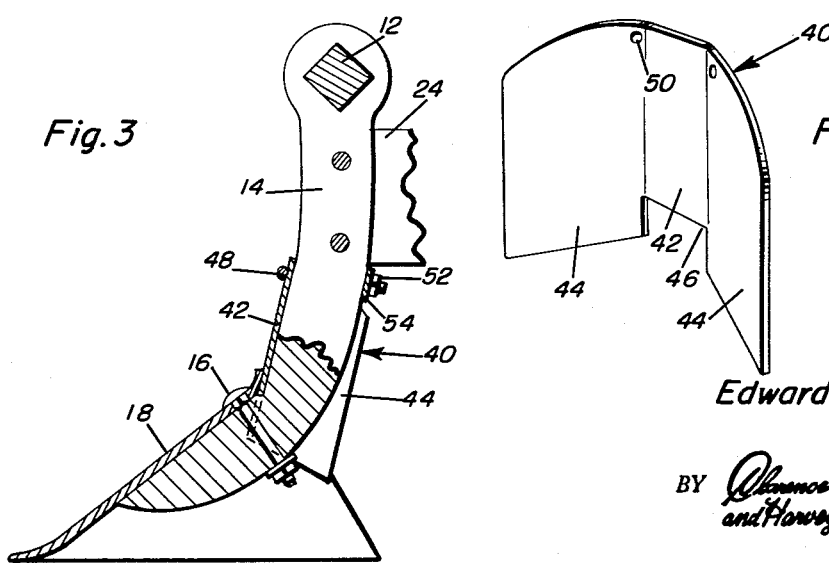
Fig. 3
Fig. 4
Edward F. Doskocil
INVENTOR.
BY *Clarence A. O'Brien*
*and Harvey B. Jackson*
Attorneys

2,747,492

CLOD KNOCKER

Edward F. Doskocil, Burlington, Tex.

Application January 19, 1954, Serial No. 404,932

2 Claims. (Cl. 97—205)

This invention relates in general to improvements in agricultural implements, and more specifically to a clod knocker attachment for planter sweeps.

In the normal operation of a planter, accumulated dirt, trash, clods, etc., pass over the planter sweep and as the opener shovel for the planter forms the furrow of the row being planted, this dirt, trash, clods, etc., pass over top of the opener shovel and fall into the furrow so as to mix with the seeds being dropped. Inasmuch as such foreign matter will greatly retard the growth of a plant resulting from the seeds, it is readily apparent that it is highly desirable to prevent the passage of this matter over the sweep and opener shovel and into the furrow.

It is therefore the primary object of this invention to provide an improved attachment which may be secured to the shank of a sweep support to form a continuation of the sweep whereby clods, trash and other matter will be prevented from passing upwardly over the sweep and will be forced outwardly of the sweep and automatically fall into the furrows on both sides of the row being planted.

Another object of this invention is to provide an improved clod knocker attachment for sweeps of planters, the clod knocker attachment being formed of a single sheet and being of such a shape whereby it may be easily stamped.

A further object of this invention is to provide an improved clod knocker attachment for a sweep of a planter, the clod knocker attachment being of a simple nature and being easily attachable to the shank of a sweep support by a simple fastener.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of a sweep of a planter and its associated planter shoe and cover shovels, the upper portion of the seed tube being shown in section;

Figure 2 is a side elevational view of the sweep of Figure 1 and shows the general relationship of the clod knocker attachment secured to the shank of the support therefor;

Figure 3 is an enlarged fragmentary vertical sectional view taken substantially upon the plane indicated by the section line 3—3 of Figure 1 and shows the exact relationship between the clod knocker attachment, the shank of the sweep support, and the sweep; and Figure 4 is an enlarged rear perspective view of the clod knocker attachment.

Referring now to the drawings in detail, it will be seen that there is illustrated in Figures 1 and 2 a portion of a planter which is referred to in general by the reference numeral 10. The planter 10 is primarily supported by a tool support 12 which has secured thereto a downwardly directed shank 14. Removably secured to the lower part of the shank portion 14 by a fastener 16 is a sweep 18.

The planter 10 also includes a planter shoe 20 which has connected thereto a seed tube 22, the seed tube extending upwardly from the planter shoe 20. The planter shoe 20 is supported by a pair of forwardly extending straps 24 which are suitably secured to the shank 14 and has an opener shovel 25 disposed forwardly thereof.

The planter 10 also includes a pair of rearwardly extending arms 26 whose forward ends are secured to the straps 24 through the use of horizontal pivot pins 28. The arms 26 have their rear ends connected by a transverse bar 30 which has adjustably clamped thereto shanks 32 by clamps 34. Carried at the extreme rear ends of the shanks 32 are cover shovels 36.

In the normal operation of the planter 10, clods, trash, etc., have the tendency to pass upwardly over the sweep 18 and down into the furrow formed by the opener shovel 25. In order that this may be prevented, there is provided the clod knocker which is the subject of this invention, the clod knocker being referred to in general by the reference numeral 40. As is best illustrated in Figure 4, the clod knocker 40 is formed of a single plate which includes a flat central portion 42 and a pair of rearwardly and outwardly extending wings 44. The wings 44 extend downwardly below the central portion 42 to form a notch 46. It will be noted that the lower edges of the wings 44 slope downwardly and outwardly and that the upper edges of the wings 44 curve downwardly and outwardly.

When the clod knocker 40 is properly positioned, the central portion 42 is disposed immediately forward of the shank 14 above the sweep 18 with an intermediate portion of the shank 14 passing through the notch 46. The lower edges of the wings 44 are disposed behind the upper parts of the sweep 18 and in engagement with the rear surface thereof.

The relationship between the lower portions of the wings 44 and the sweep 18 and the central portion 42 and the shank 14 is such that the lower portion of the clod knocker 40 is clamped between the sweep 18 and the shank 14. The upper portion of the clod knocker 40 is retained in place by a U-bolt 48 which is passed around the shank 14 and which has its legs passed through apertures 50 in the wings 44. Removably carried by the legs of the U-bolt 48 are nuts 52 which cooperate with a claw bar 54 to clamp the central portion 42 against the shank 14.

It will be seen that the clod knocker attachment 40 forms an upward extension for the sweep 18 and that the wings 44 thereof conform to the general relationship of the wing portions of the sweep 18. Thus, it will be seen that any clods, trash, etc., which have a tendency to pass upwardly over the sweep 18 will be struck by the clod knocker attachment 40 and forced outwardly so as to fall into furrows on both sides of the row being planted. Thus, this undesirable matter will not drop into the row immediately adjacent the seeds being planted to retard their growth. It will be noted that the relationship of the clod knocker attachment 40 and the plow is such that it is readily clamped in place through the use of a single fastener.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In combination with a planter, a clod knocker attachment, said planter including a sweep support having a shank, a sweep carried by said shank, said clod knocker attachment being in the form of a plate having a central portion overlying and secured to said shank, and rearwardly and outwardly directed wings, said wings being disposed rearwardly of said sweep and having lower portions engaging the rear of said sweep to form a direct continuation of said sweep, said central portion terminating above lower edges of said wings and said shank passing between said wings.

2. In combination with a planter, a clod knocker attachment, said planter including a sweep support having a shank, a sweep carried by said shank, said clod knocker attachment being in the form of a plate having a central portion overlying and secured to said shank, and rearwardly and outwardly directed wings, said wings being disposed rearwardly of said sweep and having lower portions engaging the rear of said sweep to form a direct continuation of said sweep, said central portion terminating above lower edges of said wings and said shank passing between said wings, the lower portion of said plate being clamped between said sweep and said shank, and removable fastening means securing an upper portion of said plate to said shank.

References Cited in the file of this patent

UNITED STATES PATENTS

| | | |
|---|---|---|
| 277,786 | Ring | May 15, 1883 |
| 814,551 | Lunsford | Mar 6, 1906 |
| 2,351,173 | White | June 13, 1944 |